(12) United States Patent
Wartluft (10) Patent No.: US 6,877,777 B1
(45) Date of Patent: Apr. 12, 2005

(54) INSERTION SLEEVE AND STIFFENER FOR A PIPE COUPLING

(75) Inventor: Donald W. Wartluft, Broken Arrow, OK (US)

(73) Assignee: Continental Industries, Inc., Tulsa, OK (US)

( * ) Notice: Subject to any disclaimer, the term of this patent is extended or adjusted under 35 U.S.C. 154(b) by 0 days.

(21) Appl. No.: 10/404,833

(22) Filed: Apr. 1, 2003

Related U.S. Application Data
(60) Provisional application No. 60/372,860, filed on Apr. 16, 2002.

(51) Int. Cl.[7] .............................................. F16L 33/00
(52) U.S. Cl. ..................... 285/255; 285/239; 285/307
(58) Field of Search ................................ 285/307, 398, 285/371, 239, 240, 241, 249, 351, 245, 247, 255, 259, 246, 384

(56) References Cited

U.S. PATENT DOCUMENTS

| | | | | |
|---|---|---|---|---|
| 651,134 A | * | 6/1900 | Dickens .................... 285/239 |
| 1,030,184 A | * | 6/1912 | Jackson .................... 285/247 |
| 2,610,869 A | * | 9/1952 | Allison ..................... 285/249 |
| 3,726,320 A | * | 4/1973 | Lachenmayer ............. 285/398 |
| 3,900,221 A | * | 8/1975 | Fouts ........................ 285/276 |
| 4,133,564 A | * | 1/1979 | Sarson et al. .............. 285/321 |
| 4,212,487 A | * | 7/1980 | Jones et al. ................ 285/259 |
| 4,516,796 A | * | 5/1985 | Hudson ..................... 285/384 |
| 4,645,245 A | * | 2/1987 | Cunningham .............. 285/351 |
| 4,863,202 A | * | 9/1989 | Oldford ..................... 285/351 |
| 5,366,260 A | | 11/1994 | Wartluft .................... 285/323 |
| 5,524,940 A | | 6/1996 | Wartluft .................... 285/322 |
| 5,692,785 A | * | 12/1997 | Wartluft et al. ............ 285/351 |
| 5,791,698 A | | 8/1998 | Wartluft et al. ............ 285/328 |
| 5,853,272 A | | 12/1998 | Wartluft et al. ............ 408/199 |
| 5,975,587 A | | 11/1999 | Wood et al. ................ 285/15 |
| 6,050,613 A | | 4/2000 | Wartluft .................... 285/328 |
| 6,286,542 B1 | | 9/2001 | Morain et al. .............. 137/317 |
| 6,324,739 B1 | * | 12/2001 | Fujii et al. ................. 285/247 |

FOREIGN PATENT DOCUMENTS

| | | | | |
|---|---|---|---|---|
| GB | 2271157 | * | 4/1994 | ................. 285/239 |
| JP | 266394 | * | 3/1990 | ................. 285/239 |

* cited by examiner

*Primary Examiner*—David Bochna
(74) *Attorney, Agent, or Firm*—Head, Johnson & Kachigian (57) ABSTRACT

An insertion sleeve for a pipe coupling. The coupling includes a rigid stiffener tube in a fixed position within a shell, the stiffener tube having an external diameter less than the internal diameter of a pipe to be secured by the coupling. The insertion sleeve includes a cylindrical portion having an external diameter less than the internal diameter of the pipe, a first end of the sleeve which may be axially inserted over the stiffener tube, and a second end of the sleeve having a shoulder to abut the pipe after axial insertion of the pipe over the first end and the cylindrical portion and having a tapered opening in angular relation to the axis of the cylindrical portion.

6 Claims, 6 Drawing Sheets

INSERTION SLEEVE AND STIFFENER FOR A PIPE COUPLING

CROSS-REFERENCE TO PENDING APPLICATIONS

This application is based on U.S. Provisional Patent Application No. 60/372,860 filed Apr. 16, 2002 and entitled "Insertion Sleeve For A Pipe Coupling".

BACKGROUND OF THE INVENTION

1. Field of the Invention

The present invention relates to an insertion sleeve and stiffener to be utilized with a stab-type coupler designed to couple a pipe to a coupler fitting. In particular, the present invention is directed to an insertion sleeve for a pipe coupler which will eliminate the need to chamfer the end of the pipe and will lessen the requirement to cut the pipe perpendicular to the pipe axis.

2. Prior Art

The insertion sleeve of the present invention is designed to operate with a stab-type coupler which is inserted manually onto the end of a length of plastic pipe. The pipe may be engaged with the coupler by axial insertion but the extraction of the pipe from the coupler cannot be accomplished. To insert, the plastic pipe is pushed on and over a rigid stiffener. Additionally, the stab-type connector forms a sealed, leak-proof communication between the pipe and the coupler and in some embodiments with another object, such as another length of pipe. It is desirable to employ a minimum number of parts that might be dropped or lost so that the coupler is easy to use in field applications.

Thermoplastic piping is generally produced by extrusion of long lengths which are then cut, often times at the field installation location, to a desired length or lengths. The thermoplastic pipe may be composed of a variety of materials, such as polyvinyl chloride (PVC), polyethylene (PE), or acrylonitrile-butadiene styrene (ABS).

During field installation, when the thermoplastic pipe is cut to a desired length, the end is typically cut off perpendicular to the axis of the pipe. The face of the pipe end is ideally flat, although because of many conditions and situations encountered in the field, this may not always be the case.

Some stab-on couplings provide a seal between the coupling and the outside circumference of the plastic pipe. Others, such as Assignee's Patent (U.S. Pat. No. 5,692,785 for "Plastic Pipe Coupler With Internal Sealer" to Wartluft and Wood which is incorporated herein by reference) provide a seal between the coupling and the inside of the plastic pipe. Since the outside surface of the plastic pipe is easily scratched or damaged, this is an advantageous arrangement.

Moreover, before the pipe end is inserted into a fitting, it has been found to be desirable to provide a beveled edge to the pipe end.

In some applications, it is desirable to have the bevel on the outside edge (to the outside diameter of the pipe). In other applications, it is desirable to have a bevel on the inside edge (to the inside diameter of the pipe). In further applications, it is desirable to have a bevel on both the outside and on the inside edges. This allows for easier installation into the socket depths of the coupling and will also allow the leading front edge of the plastic pipe to pass over O-rings or other seals without unseating the seals or O-rings.

In the past, a number of measures have been taken to achieve this result. Chamfering or beveling of pipe ends has been performed by shaving with a blade.

One such tool similar to a pencil sharpener has an angled blade oriented in a holder. Examples are seen in Muse (U.S. Pat. No. 2,838,773) and Dackow (U.S. Pat. No. 3,595,107). While these tools adequately put a bevel on the edge or on the edges, they also leave shavings or chips in the process.

Another solution to placing a beveled edge on the pipe end is seen in Assignee's own U.S. Pat. No. 5,853,272 for a "Plastic Pipe End Forming Tool". Inside, outside, or both inside and outside bevels are formed into the end of a plastic pipe.

Notwithstanding the foregoing, it would be desirable to eliminate the requirement of placing a beveled edge on a plastic pipe end prior to engaging a stab-on coupler.

It would additionally be desirable to provide a stab-on coupling which would accommodate a pipe end that is not exactly perpendicular to the axis of the pipe.

It would also be desirable to provide an insertion sleeve for a coupler to eliminate the need to chamfer the end of a pipe.

It would also be desirable to provide a coupler having a stiffener that would accommodate an insertion sleeve.

SUMMARY OF THE INVENTION

The present invention provides an insertion sleeve and stiffener for a plastic pipe coupling. The insertion sleeve may be pre-installed on a rigid stiffener tube of a plastic pipe coupling. The stiffener tube secured within the coupler device has an external diameter less than the internal diameter of the plastic pipe.

The insertion sleeve includes a cylindrical portion which has an external diameter less than the internal diameter of the pipe. Once inserted over and around the stiffener tube, the cylindrical portion is coaxial with the stiffener tube.

The insertion sleeve also includes a first end which is both flexible and resilient. The first end extends from the cylindrical portion and has an internal diameter equal to or even slightly less than the external diameter of the stiffener tube. In a preferred embodiment, the first end has an internal diameter slightly less than the external diameter of the rigid stiffener so that it flexes around and tends to grip the stiffener tube.

In one embodiment, the rigid stiffener has a recess to receive the first end of the insertion sleeve so that the first end of the insertion sleeve nests in the recess.

The insertion sleeve also includes a second end opposed to the first end. The second end extends from the opposed end of the cylindrical portion. The second end includes a shoulder or flange which will permit the plastic pipe end to abut against the shoulder after axial insertion of the plastic pipe over the first end and over the cylindrical portion of the sleeve. Upon axial insertion, the second end forms the leading edge of plastic pipe.

The second end also includes a tapered internal opening. The tapered internal opening is frusto-conical in shape and is in angular relation to an axis of the cylindrical portion.

The diameter of the tapered internal opening tapers from the largest diameter to its smallest diameter where the second end joins the cylindrical portion. At its largest diameter, the internal diameter of the second portion is slightly larger than the total diameter of the stiffener tube and the seal or O-ring over which it will pass.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
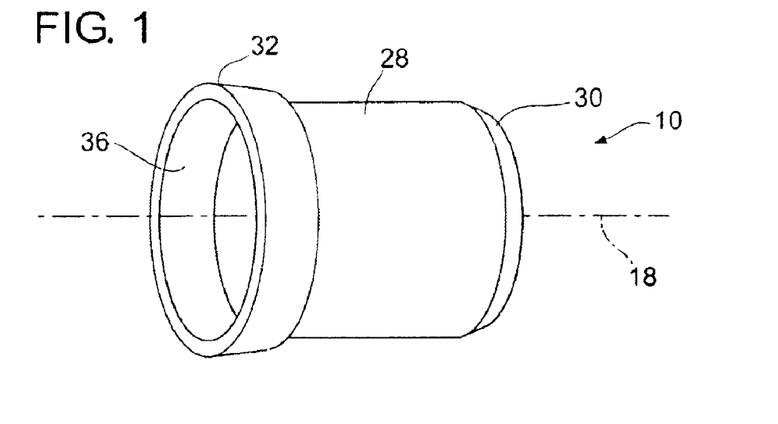
FIG. 1 is a perspective view.
Figure 2:
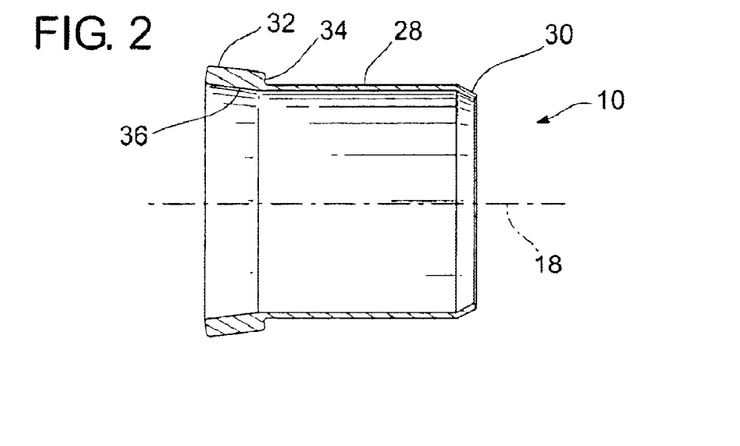
FIG. 2 is a sectional view of an insertion sleeve for a pipe coupling constructed in accordance with the present invention.
Figure 3:
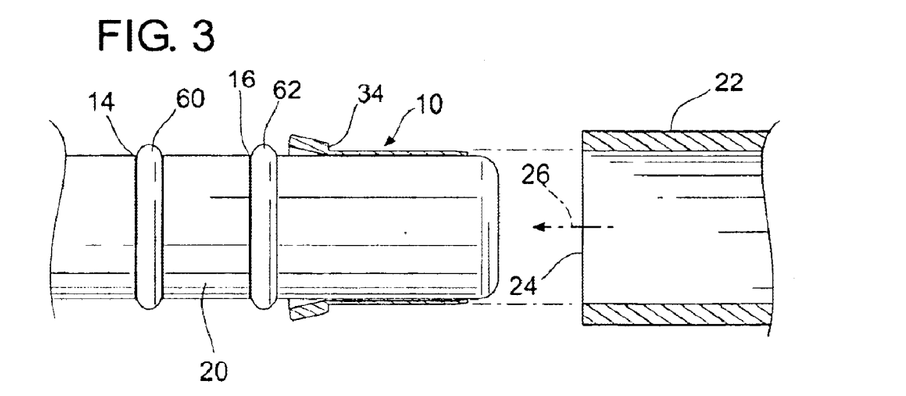
FIG. 3 is a sectional view of an insertion sleeve as shown in FIGS. 1 and 2 inserted on a stiffener tube for a pipe coupling.

Referring to the drawings in detail, FIGS. 1 and 2 illustrate a perspective and a sectional view, respectively, of an insertion sleeve 10 as set forth in the present invention for use with a plastic pipe coupling. FIG. 3 illustrates a sectional view of an insertion sleeve 10 which has been pre-installed on a rigid hollow stiffener tube 20 of a pipe coupling (not seen in FIG. 3).

In the present embodiment, a plastic pipe is connected to a coupling although other types of pipes might be utilized. A portion of a plastic pipe 22 having a leading edge end face 24 is visible. In order to connect the pipe to the coupling, the plastic pipe 22 is inserted axially in the direction illustrated by arrow 26.

The insertion sleeve 10 includes a cylindrical portion 28 which has an axis 18 (illustrated by dashed line in FIGS. 1 and 2) and an external diameter less than the internal diameter of the plastic pipe 22. Once inserted over and around the stiffener tube 20, the cylindrical portion 28 of the insertion sleeve is coaxial with the stiffener tube.

The insertion sleeve 10 also includes a first end 30 which extends axially from the cylindrical portion 28 and is both flexible and resilient. The first end has an internal diameter equal to or even slightly less than the external diameter of the stiffener tube 20. In a preferred embodiment shown in FIGS. 1, 2 and 3, the first end 30 has an internal diameter slightly less than the external diameter of the rigid stiffener so that it flexes around and tends to grip the stiffener tube 20.

As best seen in FIG. 3, the stiffener tube 20 has a pair of external toroidal grooves 14 and 16. An O-ring 60 and 62, respectively, or other seal resides in each groove.

The insertion sleeve 10 also includes a second end 32 opposed to the first end 30 and extending axially from the cylindrical portion 28. The second end 32 includes a shoulder 34 or flange which will permit the plastic pipe end 24 to abut against the shoulder 34 after axial insertion of the plastic pipe 22 over the first end 30 and over the cylindrical portion 28 of the sleeve.

The second end 32 also includes a tapered internal opening 36. The tapered internal opening 36 is frusto-conical in shape and the surface is in angular relation to the axis 18 of the cylindrical portion 28 of the sleeve. In one embodiment, the angle is 17–20°, although it will be understood that other angles are possible within the teachings of the present invention.

The internal diameter of the second end 32 tapers from the largest diameter to its smallest diameter where the second end 32 joins the cylindrical portion. At its largest diameter, the internal diameter is slightly larger than the total diameter of the stiffener tube and seal or O-ring over which it will pass.

The insertion sleeve 10 of the present invention may be utilized with various types of couplings and various types of embodiments.

Figure 4:
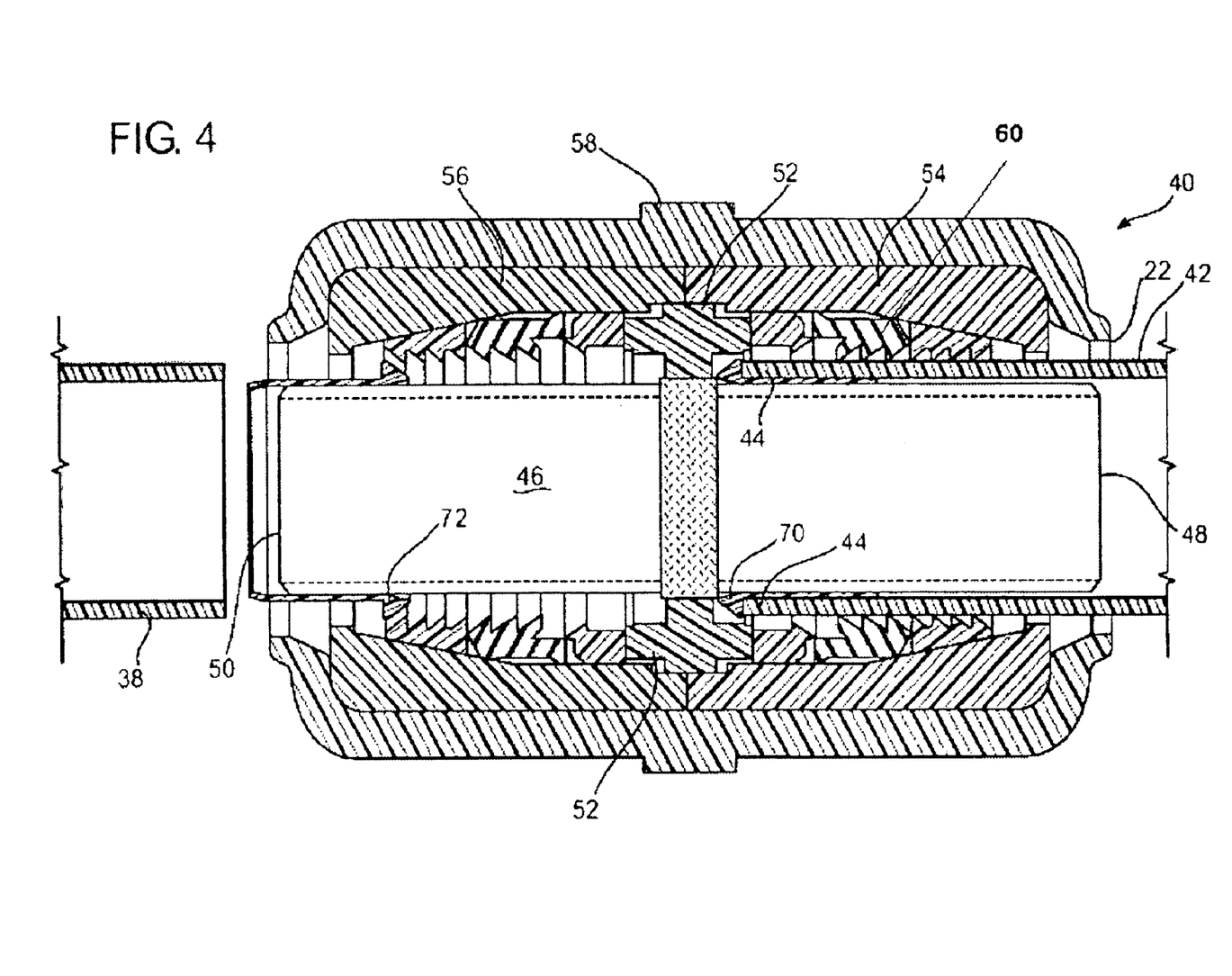
FIG. 4 is a sectional view of one type of pipe coupling which includes the insertion sleeve of the present invention.

FIG. 4 illustrates a sectional view of one type of coupler device 40 for joining two pipes together with one plastic pipe 42 having a leading end 44 shown inserted into the coupling 40. The other plastic pipe 38 is shown apart from the coupler device.

The coupler 40 has a straight hollow stiffener tube 46 that extends through the length of the coupler device 40. The stiffener tube 46, constructed of a rigid material, has opposed ends 48 and 50 that protrude up to open ends on the coupler device 40.

The stiffener tube 46 has an external diameter less than the internal diameter of the plastic pipe 42 to permit the pipe 42 to be slipped over the end of the stiffener. The stiffener 46 is secured within the coupler device 40 by a hub member 52.

The hub member 52 is secured radially within the coupler device 40 by a hollow and elongated rigid coupler shell comprised of shell halves 54 and 56. The shell has openings at each end which communicate via separate internal narrowing portions with a separate, straight internal portion. A protective outer body 58 surrounds the shell halves 54 and 56.

Once the plastic pipe or pipes have been fully inserted into the coupler, the pipes are held in place by backward oriented grippers. A flexible seal 60 positioned within the shell 58 sealingly engages an outside surface of the pipe.

The coupler 40 and the sealing action of the coupler are described in detail in Assignee's U.S. Pat. No. 5,524,940 entitled "Pipe Coupler Device", which is incorporated herein by reference.

Insertion sleeves 70 and 72 are pre-installed on the rigid stiffener 46. Accordingly, when the plastic pipe 42 is axially inserted, it will pass over the end of the rigid stiffener 48, over the first end of the insertion sleeve 70, over the cylindrical portion of the insertion sleeve, and engage the shoulder of the second end of the insertion sleeve 70. Thereafter, any further axial movement of the pipe 42 will cause the sleeve 70 to move axially.

Figure 5:
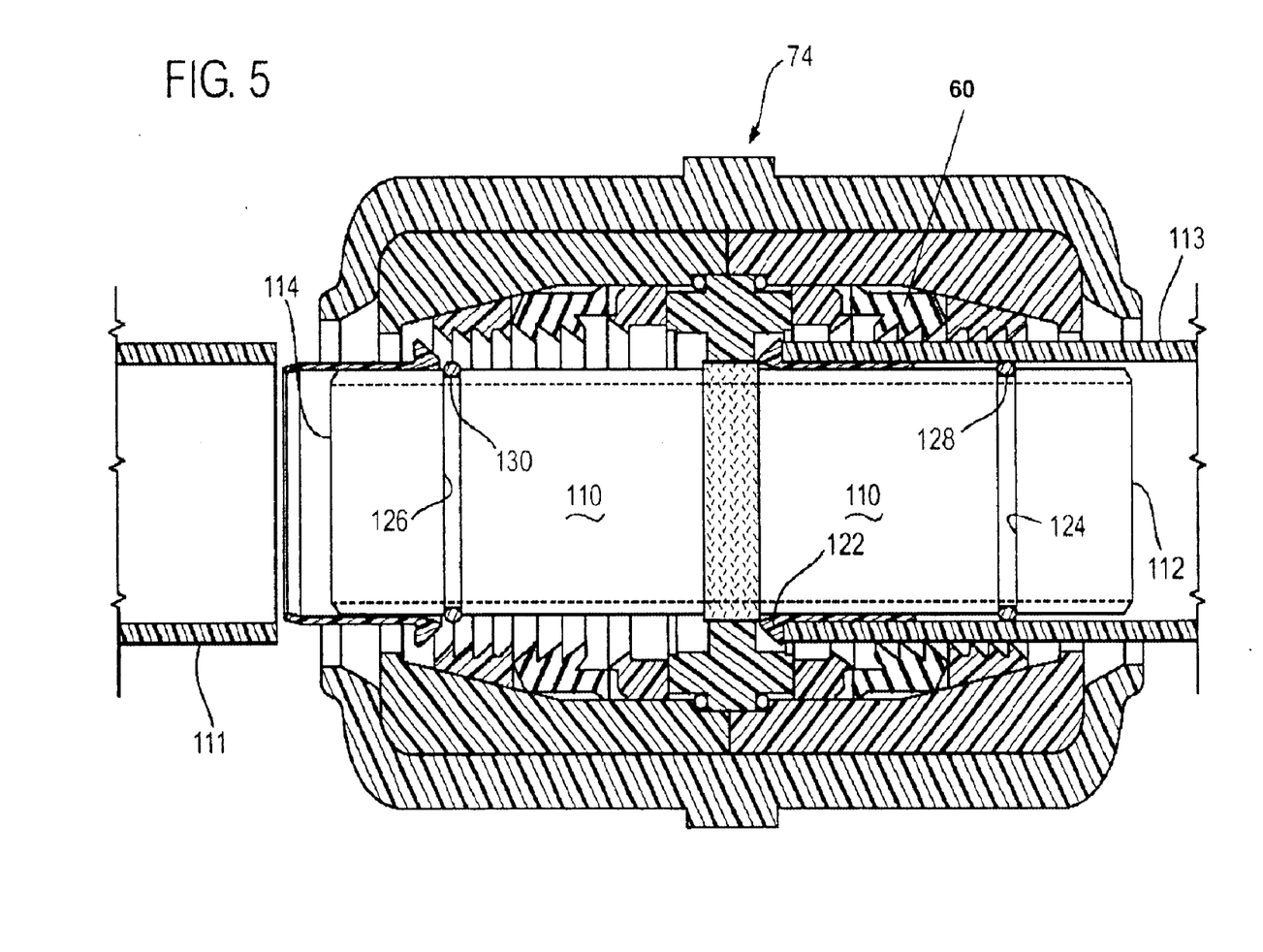
FIG. 5 is a sectional view of an alternate type of pipe coupling utilizing the insertion sleeve of the present invention.

FIG. 5 shows a sectional view of an alternate embodiment of a coupler 74 utilizing the insertion sleeve of the present invention.

The coupler 74 has a straight, hollow stiffener tube 110 that extends through the length of the coupler device 74. The stiffener tube 110, constructed of a rigid material such as metal, has ends 112 and 114 that protrude up to open ends on the coupler device 74.

The stiffener tube 110 has an external diameter less than the internal diameter of the plastic pipes 111 and 113 to permit the pipe to be axially inserted and slipped over the end 112 of the stiffener tube. The stiffener tube is secured within the coupler device 74 by a hub member 116. Plastic pipe 113 has been fully inserted into the coupler while pipe 111 is shown prior to insertion.

The coupler is similar to the coupler shown in FIG. 4 and as described in Assignee's U.S. Pat. No. 5,692,785 entitled "Plastic Pipe Coupler With Internal Sealer", which is incorporated herein by reference. The sealing mechanism of the coupler is by an internal seal which creates a seal between the interior of the pipe and the coupler. Each end of the stiffener tube 10 includes a toroidal groove 124 and 126. Residing within each groove is an O-ring 128 and 130, respectively. With continuing reference to FIG. 5 and additional reference to FIG. 3, an insertion sleeve 122 will move up to and over the O-ring 128 without disturbing or otherwise negatively influencing the O-ring.

Figure 6:
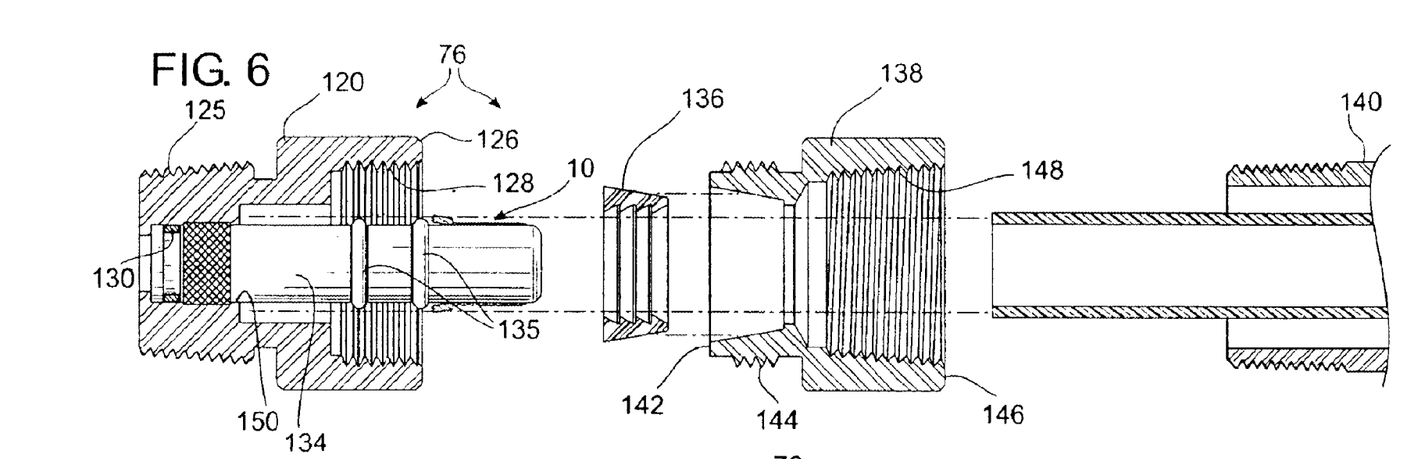
FIG. 6 is an exploded view.
Figure 7:
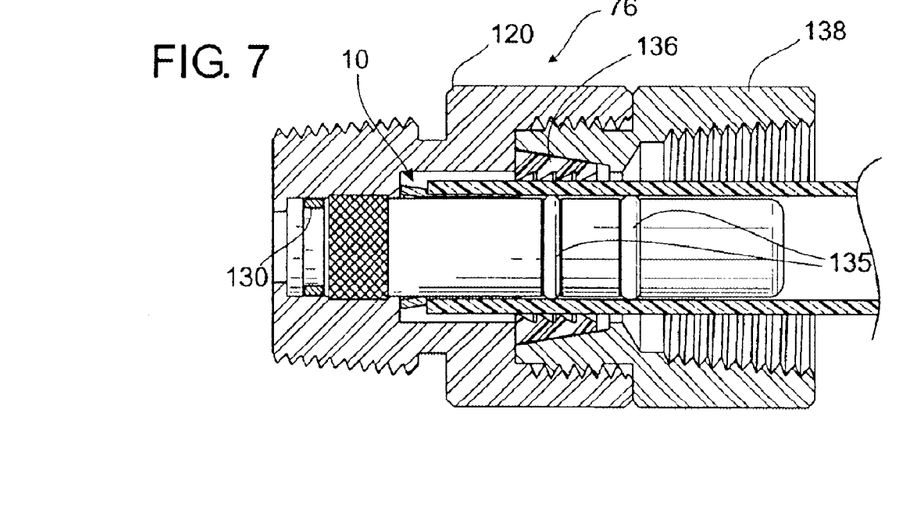
FIG. 7 is a sectional view of a further alternate pipe coupling utilizing the insertion sleeve of the present invention.

FIG. 6 shows an exploded view and FIG. 7 shows a sectional view of a further alternate embodiment of a coupler 76 utilizing the insertion sleeve of the present invention. The coupler illustrated in FIGS. 6 and 7 is intended to operate as a transition coupling. The transition coupling 76 includes an adapter nut 138 having a passageway therethrough and a first end 142 with external threads 144. An opposed, second end 146 includes internal threads 148. External threads 125 of the end of the adapter body 120 will threadably engage the metal parts of a service head adapter, such as a metal shut-off valve.

The adapter body 120 includes a recess 150 having a shoulder which will receive a rigid stiffener tube 134. The rigid stiffener tube 134 is formed of metal, hard plastic or other rigid material.

An O-ring or toroidal elastomeric seal 135 is inserted over a circumferential groove or grooves in the rigid stiffener tube 134. An insertion sleeve 10 is pre-installed over the rigid stiffener tube.

A hollow gripper 136 having a frusto-conical external surface may be positioned within a recess of an adapter nut 138. The gripper 136 has an internal circumferential surface configured to grippingly engage a plastic pipe. The adapter nut 138 has an opening therethrough and is connected to the adapter body 120.

After the plastic pipe has been engaged with the transition coupling 76, a rigid or flexible metal riser 140 may be connected to the transition coupling by internal threads 148.

Figure 8:
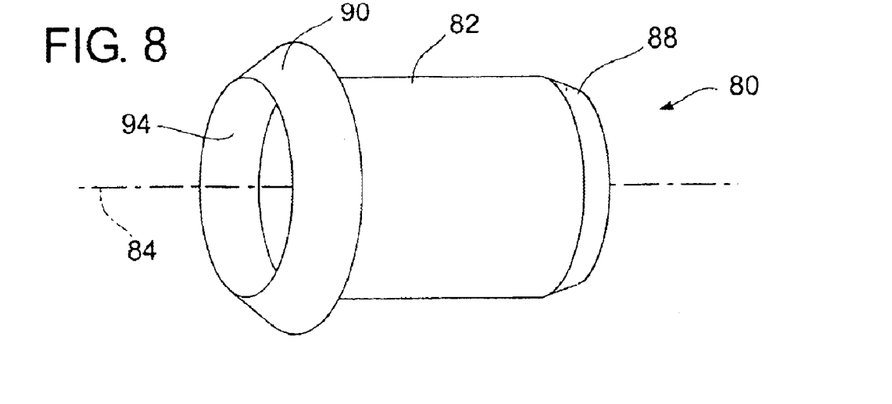
FIG. 8 illustrates a perspective view.
Figure 9:
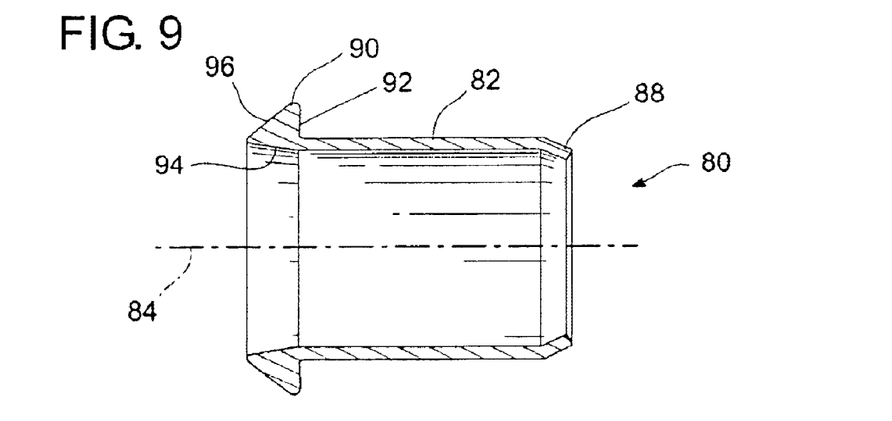
FIG. 9 is a sectional view of an alternate embodiment of an insertion sleeve constructed in accordance with the present invention.
Figure 10:
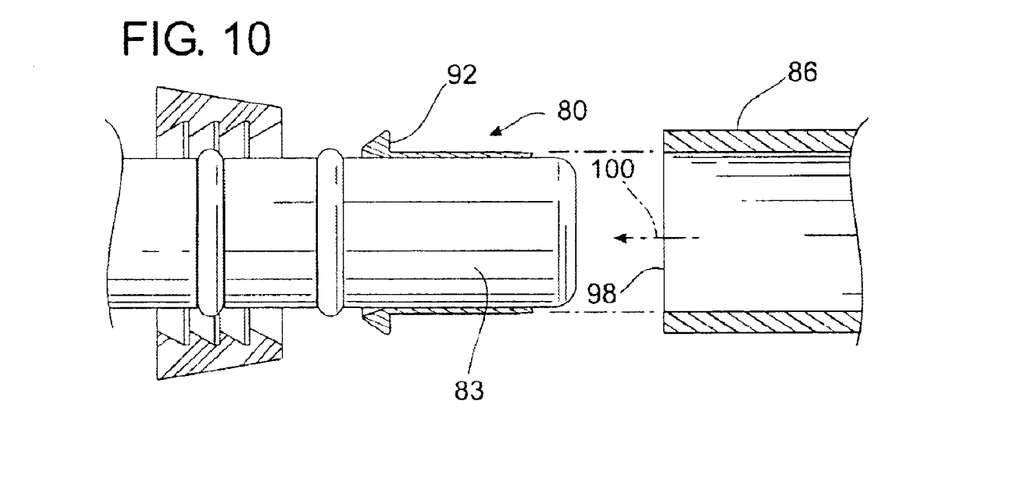
FIG. 10 illustrates a sectional view of an insertion sleeve as shown in FIGS. 8 and 9 shown installed on a stiffener tube of a pipe coupling.

FIGS. 8 and 9 show a perspective and a sectional view, respectively, of an alternate embodiment of an insertion sleeve 80 and FIG. 10 illustrates a sectional view of the insertion sleeve 80 pre-installed on a rigid stiffener tube 83 of a plastic pipe coupler. A portion of a plastic pipe 86 having a leading edge 98 is visible.

The insertion sleeve 80 includes a cylindrical portion 82 having an axis 84 and an external diameter less than the internal diameter of the plastic pipe 86. The plastic pipe 86 is inserted axially in the direction illustrated by arrow 100 in FIG. 10.

The insertion sleeve 80 includes a first end 88 which extends axially from the cylindrical portion 82 and is both flexible and resilient. The first end 88 has an internal diameter equal to or slightly less than the external diameter of the stiffener tube 83.

The insertion sleeve 80 also includes a second end 90 opposed to the first end 88 and extending axially from the cylindrical portion 82. The second end 90 includes a shoulder 92 which will permit the plastic pipe end 98 to abut against the shoulder 92 after axial insertion of the plastic pipe over the first end and over the cylindrical portion 82 of the sleeve. The second end also includes a tapered internal opening 94. Finally, the second end also includes a chamfered portion 96 which will permit the plastic pipe end to accommodate and pass under any external seals on the coupler device as discussed above.

Figure 11:
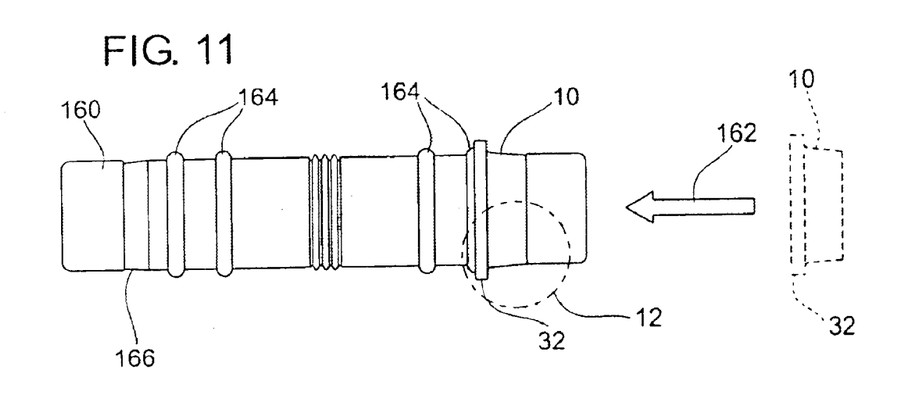
FIG. 11 illustrates a sectional view of an insertion sleeve as shown in FIGS. 1 and 2 installed on a modified stiffener tube of a pipe coupling constructed in accordance with the present invention.
Figure 12:
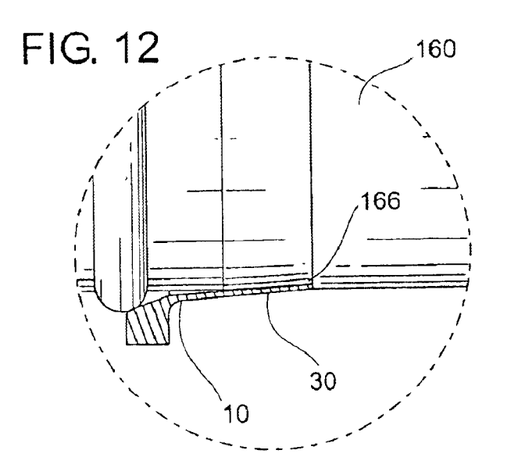
FIG. 12 is an enlarged view of a portion of the sleeve and stiffener shown in FIG. 11.

FIGS. 11 and 12 illustrate a further alternate embodiment. As seen in FIG. 1, the insertion sleeve 10 is coaxial with a stiffener 160 for a coupler device for joining two pipes (not shown). The first end 30 of the sleeve has an internal diameter slightly less than the external diameter of the stiffener tube 160. The insertion sleeve 10 flexes and stretches around and tends to grip the stiffener tube 160. Arrow 162 illustrates the direction of movement of the insertion sleeve 10 on the stiffener tube.

The insertion sleeve 10 also includes a second end 32 opposed to the first end 30 and includes a shoulder which will permit the plastic pipe end (not shown) to abut against the shoulder after axial insertion of the plastic pipe over the first end of the sleeve, as described above.

The stiffener tube 160 has external toroidal grooves in which reside O-rings 164.

In the embodiment shown in FIGS. 11 and 12, the rigid stiffener 160 includes a pair of circumferential recesses in the stiffener tube. Each recess is tapered, ramped or sloped and is on the stiffener 160 in advance of the O-rings. As seen in FIG. 11, one insertion sleeve is shown installed on the stiffener 160.

When the insertion sleeve 110 is axially inserted over the stiffener 160, it will be moved until the first end 30 of the insertion sleeve will reside in the recess 166. Since the first end 30 of the insertion sleeve is flexible resilient, it will stretch over and fit within the recess 166. This is the position of the insertion sleeve until the plastic pipe is inserted. With the insertion sleeve first end 30 residing in the recess, the first end 30 of the insertion sleeve will have an outside diameter less than the outside diameter of the stiffener as best seen in the enlarged view in FIG. 12. Accordingly, when the plastic pipe is inserted onto the stiffener and first meets the insertion sleeve, there will be no chance that the pipe catches the insertion sleeve or otherwise becomes hung up. The plastic pipe will pass over the end of the stiffener 160, over the first end 30 of the insertion sleeve, over the cylindrical portion of the insertion sleeve, and engage the shoulder of the insertion sleeve. Further axial movement of the pipe will cause the sleeve to move axially.

The insertion sleeve of the present invention eliminates the need to chamfer the end of the pipe before inserting into a stab-on coupling and lessens the requirement to cut the pipe perpendicular to the pipe axis.

Whereas, the present invention has been described in relation to the drawings attached hereto, it should be understood that other and further modifications, apart from those shown or suggested herein, may be made within the spirit and scope of this invention.

What is claimed is:

1. An insertion sleeve in combination with a pipe coupling, said coupling having a rigid stiffener tube in a fixed position within a shell, said stiffener tube having an external diameter less than the internal diameter of a pipe to be secured by said coupling, wherein said insertion sleeve comprises:
   - a cylindrical portion having an external cylindrical surface with a diameter less than the internal diameter of said pipe;
   - a first end of said sleeve which may be axially inserted over said stiffener tube; and
   - a second end of said sleeve having a shoulder to abut said pipe after axial insertion of said pipe over said first end and said cylindrical portion and having a tapered internal opening in angular relation to an axis of said cylindrical portion;
   - wherein said coupling includes at least one flexible seal positioned within said shell having an internal circumferential surface configured to sealingly engage an outside surface of said pipe.

2. An insertion sleeve as set forth in claim 1 wherein said stiffener tube has an external circumferential groove and a torodial elastomeric seal received in said groove and wherein said tapered opening has a portion which has a greater diameter than an outside diameter of said elastomeric seal.

3. An insertion sleeve as set forth in claim 1 wherein said first end is flexible and resilient and has an internal diameter equal to or slightly less than said external diameter of said stiffener tube.

4. An insertion sleeve as set forth in claim 1 wherein said shoulder is chamfered.

5. An insertion sleeve as set forth in claim 1 wherein said sleeve is plastic.

6. An insertion sleeve as set forth in claim 1 wherein said sleeve is metal.

* * * * *